United States Patent
Lee et al.

(10) Patent No.: US 9,713,080 B1
(45) Date of Patent: Jul. 18, 2017

(54) DEVICE AND METHOD OF HANDLING A PUBLIC LAND MOBILE NETWORK SELECTION

(71) Applicant: HTC Corporation, Taoyuan (TW)

(72) Inventors: Ching-Lin Lee, Taoyuan (TW); Wen-Jui Hsieh, Taoyuan (TW); Chih-Hsiang Wu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 15/049,146

(22) Filed: Feb. 22, 2016

(51) Int. Cl.
*H04W 4/00* (2009.01)
*H04W 48/18* (2009.01)
*H04W 8/06* (2009.01)
*H04W 8/26* (2009.01)

(52) U.S. Cl.
CPC .......... *H04W 48/18* (2013.01); *H04W 8/06* (2013.01); *H04W 8/26* (2013.01)

(58) Field of Classification Search
CPC .......... H04W 48/18; H04W 8/06; H04W 8/26
USPC ............ 455/404.1, 412.1–414.2, 418–422.1, 455/456.1, 404.2, 521, 445, 436, 434, 455/525, 417, 558, 551, 552.1, 458, 455/435.1, 432.1, 432.2, 440; 370/328–332, 338, 401, 252, 432, 310
See application file for complete search history.

(56) References Cited

U.S. PATENT DOCUMENTS

| 2004/0058679 A1* | 3/2004 | Dillinger ............... H04W 48/16 455/439 |
| 2004/0152462 A1 | 8/2004 | Hwang |
| 2006/0099943 A1* | 5/2006 | Koo ....................... H04W 48/16 455/432.1 |
| 2007/0191006 A1 | 8/2007 | Carpenter |

(Continued)

FOREIGN PATENT DOCUMENTS

| CN | 104980993 A | 10/2015 |
| TW | 201204091 A1 | 1/2012 |

OTHER PUBLICATIONS

3GPP TS 36.304 V12.6.0 (Sep. 2015) Technical Specification 3rd Generation Partnership Project; Technical Specification Group Radio Access Network; Evolved Universal Terrestrial Radio Access (E-UTRA); User Equipment (UE) procedures in idle mode (Release 12).

(Continued)

*Primary Examiner* — Babar Sarwar
(74) *Attorney, Agent, or Firm* — Winston Hsu

(57) ABSTRACT

A communication device of handling a public land mobile network (PLMN) selection in a roaming network comprises a storage unit for storing instructions and a processing means coupled to the storage unit. The processing means is configured to execute the instructions stored in the storage unit. The instructions comprise determining that the communication device is roaming; selecting a preferred roaming PLMN with a preferred roaming PLMN ID to camp on, if the preferred roaming PLMN ID stored in a subscriber (Continued)

identity module (SIM) of the communication device; and selecting a first roaming PLMN with a first roaming PLMN ID to camp on, if the preferred roaming PLMN ID is not stored in the SIM of the communication device, or the communication device does not find the preferred roaming PLMN and the first roaming PLMN ID is associated with a first home PLMN ID of the communication device.

13 Claims, 6 Drawing Sheets

(56) References Cited

U.S. PATENT DOCUMENTS

| | | | | |
|---|---|---|---|---|
| 2008/0182615 | A1* | 7/2008 | Xue | H04W 48/16 455/552.1 |
| 2008/0200169 | A1* | 8/2008 | Gao | H04W 48/16 455/434 |
| 2010/0099403 | A1 | 4/2010 | Kim | |
| 2011/0021195 | A1* | 1/2011 | Cormier | H04W 48/18 455/435.2 |
| 2012/0122441 | A1* | 5/2012 | Kim | H04W 28/18 455/418 |
| 2012/0309391 | A1* | 12/2012 | Zhang | H04W 48/16 455/432.1 |
| 2013/0109377 | A1* | 5/2013 | Al-Khudairi | H04W 48/16 455/432.1 |
| 2013/0231105 | A1* | 9/2013 | Bai | H04W 48/18 455/426.1 |
| 2014/0024332 | A1* | 1/2014 | Droste | H04L 12/1895 455/404.2 |
| 2014/0051422 | A1 | 2/2014 | Mittal | |
| 2014/0342732 | A1 | 11/2014 | Manalo | |
| 2015/0056985 | A1* | 2/2015 | Swaminathan | H04W 88/06 455/432.1 |
| 2015/0295696 | A1* | 10/2015 | Jin | H04W 48/16 370/277 |
| 2016/0014590 | A1* | 1/2016 | Agiwal | H04W 8/005 455/426.1 |

OTHER PUBLICATIONS

3GPP TS 23.122 V12.8.0 (Sep. 2015) Technical Specification 3rd Generation Partnership Project; Technical Specification Group Core Network and Terminals; Non-Access-Stratum (NAS) functions related to Mobile Station (MS) in idle mode (Release 12).

Search Report mailed/issued on Jul. 19, 2016 for EP application No. 16156093.3, pp. 1-8.

ETSI TS 123 122 V12.8.0 (Oct. 2015), "Digital cellular telecommunications system (Phase 2+); Universal Mobile Telecommunications System (UMTS); LTE; Non-Access-Stratum (NAS) functions related to Mobile Station (MS) in idle mode (3GPP TS 23.122 version 12.8.0 Release 12)", XP014265275, pp. 1-51, Oct. 2015.

Office action mailed on Dec. 14, 2016 for the Taiwan application No. 105105062, filing date Feb. 22, 2016, p. 1-3.

* cited by examiner

| Home PLMN ID | Roaming PLMN ID | RAT |
|---|---|---|
| HPID1 | RPID1 | RAT1 |
| HPID1 | RPID1 | RAT2 |
| HPID1 | RPID2 | Empty |
| HPID2 | RPID2 | Empty |
| HPID3 | RPID3 | RAT1 |

High priority → Low priority

FIG. 4

| MCC | MNC | Roaming PLMN ID | RAT |
|---|---|---|---|
| MCC 1 | MNC 1 | RPID1 | RAT1 |
| MCC 1 | MNC 1 | RPID1 | RAT2 |
| MCC 1 | MNC 1 | RPID2 | Empty |
| MCC 1 | MNC 2 | RPID2 | Empty |
| MCC 2 | MNC 3 | RPID3 | RAT1 |

High priority → Low priority

FIG. 5

DEVICE AND METHOD OF HANDLING A PUBLIC LAND MOBILE NETWORK SELECTION

BACKGROUND OF THE INVENTION

1. Field of the Invention

The present invention relates to a device and a method used in a wireless communication system, and more particularly, to a device and a method of handling a public land mobile network (PLMN) selection in a wireless communication system.

2. Description of the Prior Art

Usually, a home operator (e.g., a telecom operator in Taiwan) of an user equipment (UE) does not have roaming agreements with all roaming operators in a roaming country (e.g., USA). The UE needs to search a public land mobile network (PLMN) to camp on, when the UE is powered on in the roaming country. The UE may take a long time to camp on a roaming network. For example, the home operator may only have a roaming agreement with a roaming operator in the roaming country. The UE may try PLMNs of lots of roaming operators and then be rejected by these roaming operators, before the UE finds a PLMN of the roaming operator with the roaming agreement. That is, the UE spends a long time on finding the proper PLMN before the UE can receives a service from the PLMN, and inconvenience is caused to a user of the UE.

Thus, how to select a proper PLMN when the UE is in the roaming network or the roaming country is an important problem to be solved.

SUMMARY OF THE INVENTION

The present invention therefore provides a communication device and method for handling a PLMN selection to solve the abovementioned problem.

A communication device of handling a public land mobile network (PLMN) selection in a roaming network comprises a storage unit for storing instructions and a processing means coupled to the storage unit. The processing means is configured to execute the instructions stored in the storage unit. The instructions comprise determining that the communication device is roaming; selecting a preferred roaming PLMN with a preferred roaming PLMN ID to camp on, if the preferred roaming PLMN ID stored in a subscriber identity module (SIM) of the communication device; and selecting a first roaming PLMN with a first roaming PLMN ID to camp on, if the preferred roaming PLMN ID is not stored in the SIM of the communication device, or the communication device does not find the preferred roaming PLMN and the first roaming PLMN ID is associated with a first home PLMN ID of the communication device.

A network of handling a public land mobile network (PLMN) selection in a roaming network comprises a storage unit for storing instructions and a processing means coupled to the storage unit. The processing means is configured to execute the instructions stored in the storage unit. The instructions comprise receiving information of a roaming PLMN ID, a home PLMN ID, and an association between the home PLMN ID and the roaming PLMN ID from a first communication device; and transmitting the information to a second communication device.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 4 is a table for PLMN selection according to an example of the present invention.

FIG. 5 is a table for PLMN selection according to an example of the present invention.

DETAILED DESCRIPTION

Figure 1:
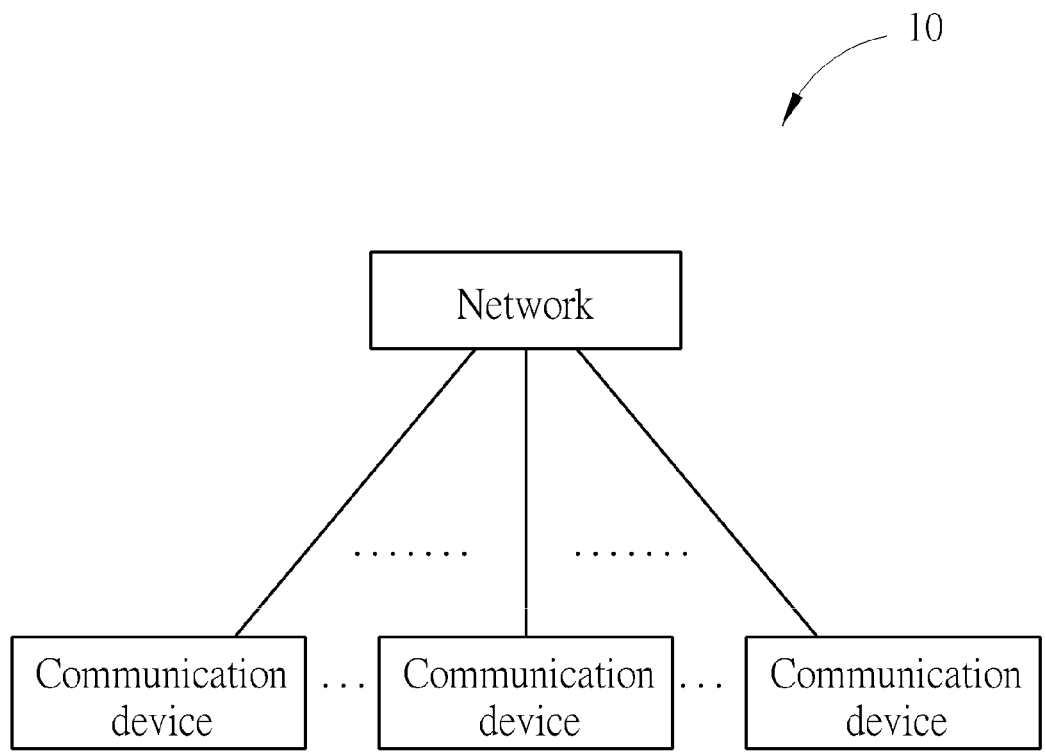
FIG. 1 is a schematic diagram of a wireless communication system according to an example of the present invention.

FIG. 1 is a schematic diagram of a wireless communication system 10 according to an example of the present invention. The wireless communication system 10 is briefly composed of a network and a plurality of communication devices. The network and a communication device may communicate with each other via one or more carriers of licensed band(s) and/or unlicensed band(s). In FIG. 1, the network and the communication devices are simply utilized for illustrating the structure of the wireless communication system 10. Practically, the network may be an evolved UTRAN (E-UTRAN) including at least one evolved NB (eNB) and/or at least one relay in a long term evolution (LTE) system, a LTE-Advanced (LTE-A) system or an evolution of the LTE-A system. The eNB or the relay may be termed as a base station.

The network may be seen as a home network in a home country, and may include a home public land mobile network (PLMN). In another example, the network may be seen as a roaming network in a roaming country (e.g., foreign country), and may include one or more roaming PLMNs. In general, the communication device needs to search for a roaming PLMN to camp on a cell of the roaming PLMN, when the UE roams to a different country. Successive procedures (e.g., cell selection, authentication) can be performed, after a proper roaming PLMN is selected.

A communication device may be a user equipment (UE), a low cost device (e.g., machine type communication (MTC) device), a device-to-device (D2D) device, a mobile phone, a laptop, a tablet computer, an electronic book, a portable computer system, a vehicle, airplane or combination thereof. In addition, the network and the communication device can be seen as a transmitter or a receiver according to direction (i.e., transmission direction), e.g., for an uplink (UL), the communication device is the transmitter and the network is the receiver, and for a downlink (DL), the network is the transmitter and the communication device is the receiver.

Figure 2:
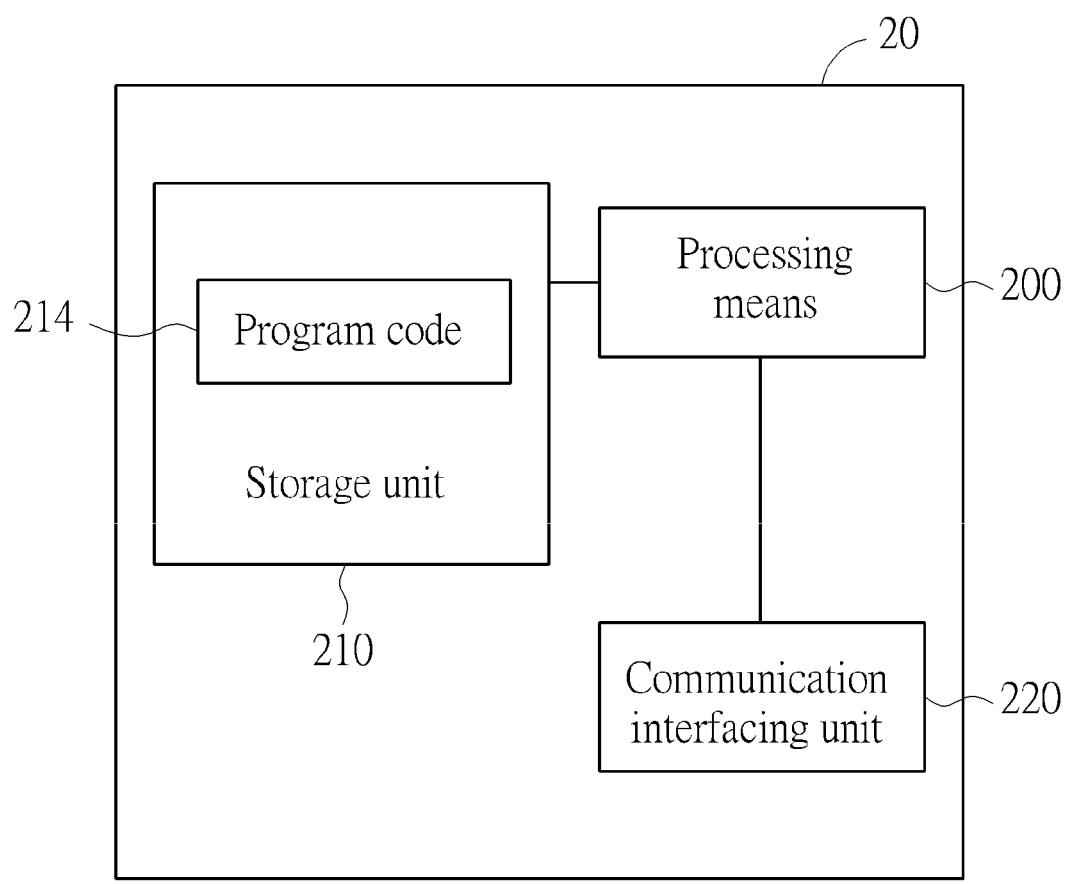
FIG. 2 is a schematic diagram of a communication device according to an example of the present invention.

FIG. 2 is a schematic diagram of a communication device 20 according to an example of the present invention. The communication device 20 may be a communication device or the network shown in FIG. 1, but is not limited herein. The communication device 20 may include a processing means 200 such as a microprocessor or Application Specific Integrated Circuit (ASIC), a storage unit 210 and a communication interfacing unit 220. The storage unit 210 may be any data storage device that may store a program code 214, accessed and executed by the processing means 200. Examples of the storage unit 210 include but are not limited to a read-only memory (ROM), flash memory, random-access memory (RAM), hard disk, optical data storage device, non-volatile storage unit, non-transitory computer-readable medium (e.g., tangible media), etc. The communication interfacing unit 220 is preferably a transceiver and is used to transmit and receive signals (e.g., data, messages and/or packets) according to processing results of the processing means 200. For simplicity, the UE is used to represent the communication device in FIG. 1 in the following embodiments.

Figure 3:
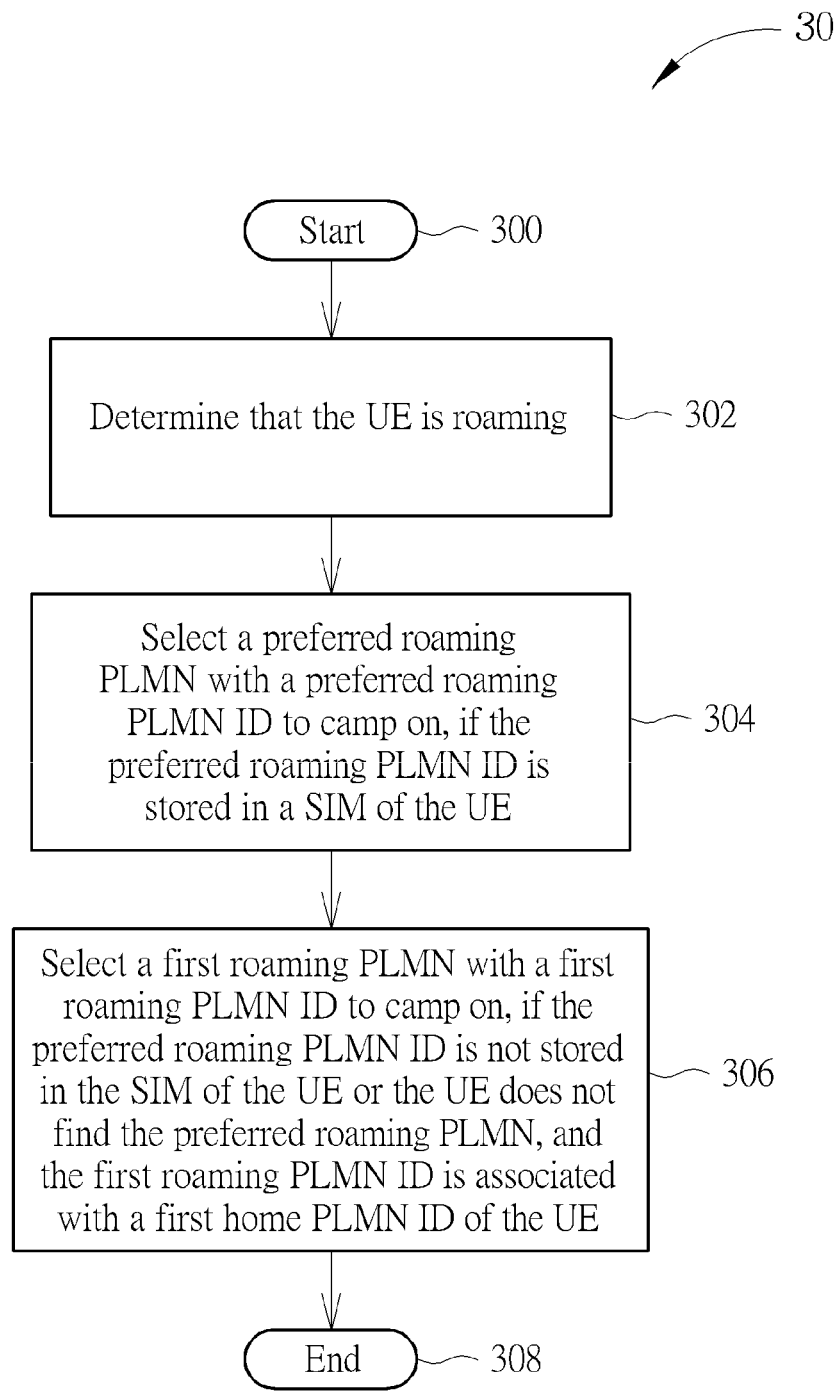
FIG. 3 is a flowchart of a process according to an example of the present invention.

FIG. 3 is a flowchart of a process 30 according to an example of the present invention. The process 30 may be utilized in a UE (e.g., the communication device in FIG. 1), to handle a PLMN selection. The process 30 may be compiled into the program code 214 and includes the following steps:

Step 300: Start.

Step 302: Determine that the UE is roaming.

Step 304: Select a preferred roaming PLMN with a preferred roaming PLMN ID to camp on, if the preferred roaming PLMN ID is stored in a subscriber identity module (SIM) of the UE.

Step 306: Select a first roaming PLMN with a first roaming PLMN ID to camp on, if the preferred roaming PLMN ID is not stored in the SIM of the UE or the UE does not find the preferred roaming PLMN, and the first roaming PLMN ID is associated with a first home PLMN ID of the UE.

Step 308: End.

According to the process 30, the UE determines that the UE is roaming. The UE selects a preferred roaming PLMN with a preferred roaming PLMN ID to camp on, if the preferred roaming PLMN ID stored in the SIM of the UE. The UE selects a first roaming PLMN with a first roaming PLMN ID to camp on, if the preferred roaming PLMN ID is not stored in the SIM of the UE or the UE does not find the preferred roaming PLMN, and the first roaming PLMN ID is associated with a first home PLMN ID of the UE and stored in the storage unit 210. That is, the UE searches the preferred roaming PLMN identified by the preferred roaming PLMN ID stored in the SIM first. Then, the UE searches the first roaming PLMN ID, if the preferred roaming PLMN ID is not available in the SIM of the UE or the UE does not find the preferred roaming PLMN. Thus, the UE can quickly and successfully camp on (e.g., a cell of) a roaming PLMN when the UE is roaming. It should be noted that the SIM may be a universal SIM (USIM). The SIM may be an integrated circuit (IC) card or an IC embedded in the UE. In another example, the SIM may a partition of the storage unit 210 of the UE.

When the UE searches a PLMN, the UE scans carrier frequencies where the UE is capable of receiving signals. If the UE finds a cell on a carrier frequency, the UE receives system information broadcasted on the cell. If the system information contains a PLMN ID, the UE finds a PLMN with the PLMN ID. If the UE does not find any cell where the PLMN ID is broadcasted, the UE does not find the PLMN.

An example is illustrated according to the process 30 as follows. The UE may have frequency information of a roaming PLMN, and is able to search a cell of the roaming PLMN on a carrier frequency according to the frequency information. However, if a preferred roaming PLMN ID is stored in a USIM of the UE and the preferred roaming PLMN ID is different from the roaming PLMN ID, the UE selects the preferred roaming PLMN and performs a cell selection to select a cell of the preferred romancing PLMN in a higher priority. If the UE fails to find the cell of the preferred roaming PLMN, the UE selects the roaming PLMN and performs the cell selection to select a cell of the roaming PLMN.

Realization of the process 30 is not limited to the above description.

In one example, the UE may determine that it is roaming, if the UE receives a roaming mobile country code (MCC) broadcasted on a cell by a roaming PLMN. That is, the UE searches a cell on a carrier frequency, receives system information of the cell, and the system information contains the roaming MCC. The received MCC in the system information may be used by the UE to identify where the UE is, i.e., roaming country. In one example, the UE may determine that it is in roaming, after the UE is powered on or an airplane/flight mode of the UE is turned off.

In one example, the UE may select the first roaming PLMN according to the first roaming PLMN ID associated with the first home PLMN ID and a first radio access technology (RAT) to camp on the first roaming PLMN, if the preferred roaming PLMN ID is not stored in the SIM. That is, an association is established between the first home PLMN ID, the first roaming PLMN ID and the first RAT. The UE camps on a cell of the first RAT of the first roaming PLMN by using its hardware and software of the first RAT. Further, the first roaming PLMN ID may be further associated with another RAT, and a priority of the first RAT is higher than a priority of the other RAT. That is, the UE may have two choices for camping in the roaming network: the first roaming PLMN ID with the first RAT and the first roaming PLMN ID with the other RAT. In the present example, the UE selects the first roaming PLMN ID with the first RAT according to the higher priority of the first RAT.

In one example, the UE may search and register to a second roaming PLMN in the roaming country, wherein a second roaming PLMN ID of the second roaming PLMN is not stored in the UE or the UE fails to register to the first roaming PLMN. The UE may associate the second roaming PLMN ID with the first home PLMN ID, and may store an association between the second roaming PLMN ID and the first home PLMN ID in the storage unit 210 of the UE. That is, the UE may store a list of one or more roaming PLMNs according to its registrations to the roaming PLMNs for the next time the UE visits the roaming country. Further, the UE may associate a second RAT of the second roaming PLMN with the second roaming PLMN ID, if the UE registers to the second roaming PLMN via a cell of the second RAT. That is, the UE may store information of the second RAT and an association between the first home PLMN ID, the second roaming PLMN ID and the second RAT. In one example, the UE may transmit information (e.g., the association) of the second roaming PLMN ID and the first home PLMN ID to a server. Thus, the server may provide the information to other UEs, for the other UEs to update their lists of roaming PLMNs. The information may further include location information related to the second roaming PLMN ID. Thus, when one of the other UEs detects it is in a location as indicated by the location information, the one of the other UEs may select the second roaming PLMN ID. Preferably, the location information may include a geographic location, WiFi positioning information, global positioning system (GPS) positioning information, etc. In one example, the UE may receive a third roaming PLMN ID of a third roaming PLMN, a second home PLMN ID and an association between the third roaming PLMN ID and the second home PLMN ID from a server, and stores the third roaming PLMN ID, the second home PLMN ID and the association between the third roaming PLMN ID and the second home PLMN ID in the UE. That is, the UE updates the list of the roaming PLMNs by itself, or by using the information provided by the server.

FIG. 4 is a table 40 for PLMN selection according to an example of the present invention. The table 40 is stored in the UE for handling a PLMN and/or cell selection in a roaming country, and can be updated after receiving related information which is mentioned above. In FIG. 4, there are home PLMN IDs HPID1-HPID3, roaming PLMN IDs RPID1-RPID3, and RATs RAT1-RAT2. Accordingly, five associations (i.e., five rows) are established. The UE can select one of the associations for performing the PLMN and/or cell selection. For the first association, the home PLMN ID HPID1 is associated with the roaming PLMN ID RPID1 and the RAT RAT1. For the second association, the home PLMN ID HPID1 is associated with the roaming PLMN ID RPID1 and the RAT RAT2. For the third association, the home PLMN ID HPID2 is associated with the roaming PLMN ID RPID2, and is not associated with any RAT. For the fourth association, the home PLMN ID HPID2 is associated with the roaming PLMN ID RPID2, and is not associated with any RAT. For the fifth association, the home PLMN ID HPID3 is associated with the roaming PLMN ID RPID3 and the RAT RAT1. In the present example, priorities of the associations are configured with a descending order according to row positions of the associations as shown in FIG. 4.

In one example, assuming that a preferred roaming PLMN ID is not stored in the SIM and the home PLMN of the UE is identified by the home PLMN ID HPID1, the UE first tries the first association for performing the PLMN and/or cell selection. That is, the UE searches a cell of the RAT RAT1 of a roaming PLMN identified by the roaming PLMN ID RPID1 by using the RAT RAT1. The UE may perform a registration procedure to the roaming PLMN, if the cell is found successfully. The UE tries the second association for performing the cell selection, if the cell is not found according the first association. That is, the UE searches a cell of the RAT RAT2 of the roaming PLMN by using the RAT RAT2. If the UE does not find the cell of the RAT RAT2, the UE tries the third association. That is, the UE searches a cell of a roaming PLMN identified by the roaming PLMN ID RPID2. The UE continues trying the next association that has the home PLMN ID HPID1 until a cell of a roaming PLMN identified by the next association is found successfully, i.e., the PLMN and/or cell selection is performed successfully. Once the UE finds the cell which is suitable, the UE registers to the roaming PLMN identified by the next association via the cell.

In one example, the UE may find the roaming PLMN identified by the roaming PLMN ID RPID1 but fails to register to it via the RAT RAT1. In this case, the UE may update the association by rearranging the association the lowest priority (e.g., moving it to the last row in the table or the last row of the associations including the home PLMN ID HPID1) or by deleting the association. Further, the UE may transmit a message to update the association to the server. Then, the server may update the association to other UEs.

FIG. 5 is a table 50 for PLMN and/or cell selection according to an example of the present invention. The table 50 is stored in the UE for handling the PLMN and/or cell selection in a roaming country, and can be updated after receiving related information which is mentioned above. In FIG. 5, there are MCCs MCC1-MCC2, mobile network code (MNCs) MNC1-MNC3, roaming PLMN IDs RPID1-RPID3, and RATs RAT1-RAT2. Accordingly, five associations (i.e., five rows) are established. The UE selects one of the associations for performing the PLMN and/or cell selection. Each combination of a MCC and a MNC is associated (e.g., mapped) to a home PLMN ID. Accordingly, operations performed for the table 40 can be applied to the table 50. The relation between the table 50 and the table 40 are explained as follows. The combination of the MCC MCC1 and the MNC MNC1 in the table 50 corresponds to the home PLMN ID HPID1 in the table 40. The combination of the MCC MCC1 and the MNC MNC2 in the table 50 corresponds to the home PLMN ID HPID2 in the table 40. The combination of the MCC MCC2 and the MNC MNC3 in the table 50 corresponds to the home PLMN ID HPID3 in the table 40. The UE can perform the PLMN and/or cell selection by using the table 50 according to the description of the table 40, and the detail is not narrated herein.

Figure 6:
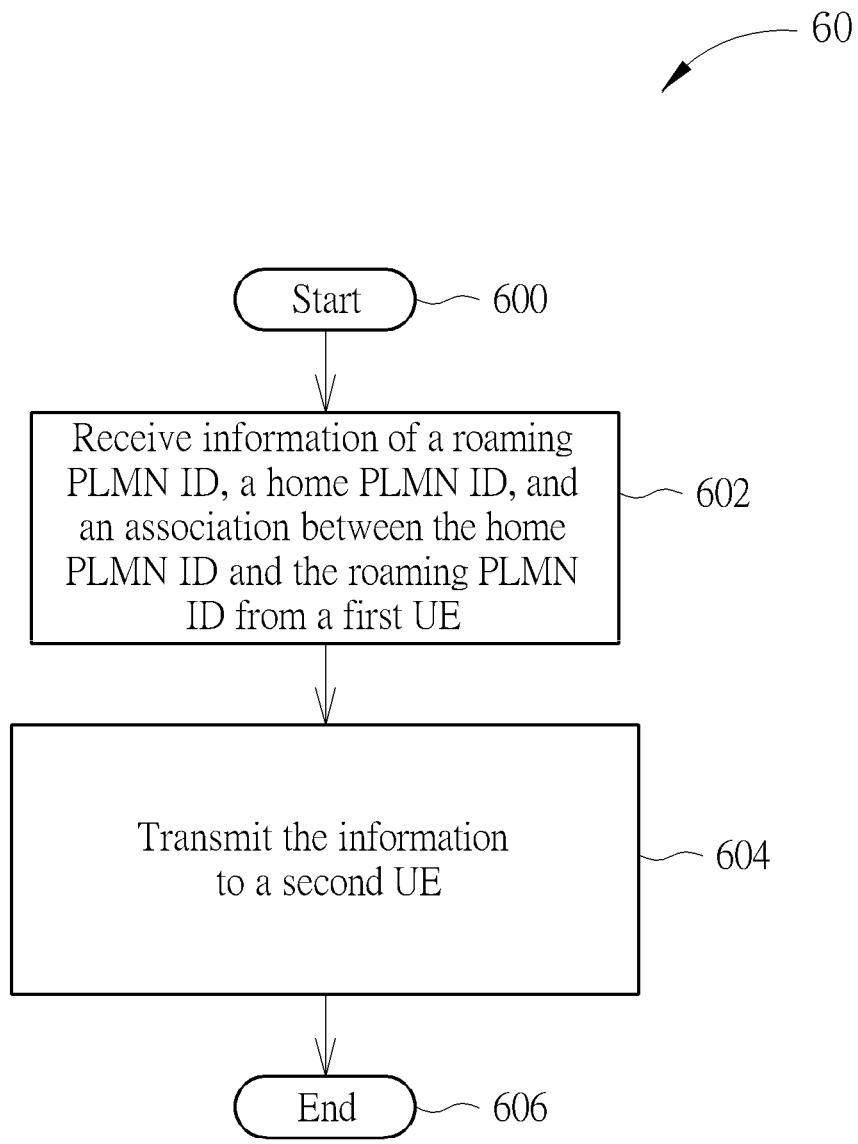
FIG. 6 is a flowchart of a process according to an example of the present invention.

FIG. 6 is a flowchart of a process 60 according to an example of the present invention. The process 60 may be utilized in a network (e.g., the network in FIG. 1), to handle a PLMN selection. The process 60 may be compiled into the program code 214 and includes the following steps:

Step 600: Start.

Step 602: Receive information of a roaming PLMN ID, a home PLMN ID, and an association between the home PLMN ID and the roaming PLMN ID from a first UE.

Step 604: Transmit the information to a second UE.

Step 606: End.

According to the process 60, the network (e.g., a server) receives information of a roaming PLMN ID, a home PLMN ID, and an association between the home PLMN ID and the roaming PLMN ID from a first UE. Then, the network transmits the information to a second UE. That is, the network collects home PLMN IDs, roaming PLMN IDs, and associations between the home PLMN IDs and the roaming PLMN IDs from a first set of UEs, and distributes the home PLMN IDs, the roaming PLMN IDs and the associations between the home PLMN IDs and the roaming PLMN IDs to a second set of UEs. Some of the first and second sets of UEs may be the same or different. Thus, a UE stores home PLMN ID(s), roaming PLMN ID(s) and association(s) between the home PLMN ID(s) and the roaming PLMN ID(s) according to contributions from other UEs. When the UE determines it is in a roaming country, the UE selects a roaming PLMN of the roaming country. That is, the UE finds the roaming PLMN ID in the highest priority order in the association(s), and searches a cell of the roaming PLMN to camp on. As a result, the UE can receive service(s) provided by the first roaming PLMN immediately. In one example, the UE searches the association(s) (e.g., table 40) by using a MCC of the roaming country to find the roaming PLMN ID.

In one example, the information may include a RAT associated with the roaming PLMN ID. In one example, the information may include location information related to the roaming PLMN ID. In one example, the UE may be configured to only transmit the information, when the UE has a WiFi connection. That is, the UE does not transmit the information via a cellular connection when the UE is roaming.

Realization of the processes 30 and 60 are not limited to the above description. Examples of the steps in the process 30 can be applied to the steps in the processes 60.

Those skilled in the art should readily make combinations, modifications and/or alterations on the abovementioned description and examples. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20.

To sum up, the present invention provides a UE and method of handling a PLMN selection. The method may be realized in a UE and/or a network (e.g., server) according various system requirements and/or design considerations. Thus, the UE can camp on a roaming PLMN of a roaming country when the UE is in the roaming country, and time for searching the roaming PLMN can be saved. As a result, the UE can receive service(s) provided by the roaming PLMN immediately.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communication device of handling a public land mobile network (PLMN) selection in a roaming country, comprising:
    a storage unit, for storing instructions of:
    determining that the communication device is roaming;
    selecting a preferred roaming PLMN with a preferred roaming PLMN ID to camp on, if the preferred roaming PLMN ID stored in a subscriber identity module (SIM) of the communication device; and
    selecting a first roaming PLMN with a first roaming PLMN ID to camp on, if the preferred roaming PLMN ID is not stored in the SIM of the communication device, or the communication device does not find the preferred roaming PLMN and the first roaming PLMN ID is associated with a first home PLMN ID of the communication device;
    searching and registering to a second roaming PLMN in the roaming country, wherein a second roaming PLMN ID of the second roaming PLMN is not stored in the communication device or the communication device fails to register to the first roaming PLMN;
    associating the second roaming PLMN ID with the first home PLMN ID;
    storing an association between the second roaming PLMN ID and the first home PLMN ID in the communication device;
    receiving a third roaming PLMN ID of a third roaming PLMN, a second home PLMN ID and an association between the third roaming PLMN ID and the second home PLMN ID from a server;
    storing the third roaming PLMN ID, the second home PLMN ID and the association between the third roaming PLMN ID and the second home PLMN ID in the communication device; and
    a processing means, coupled to the storage unit, configured to execute the instructions stored in the storage unit.

2. The communication device of claim 1, wherein the communication device determines that it is roaming, if the communication device receives a roaming mobile country code (MCC) broadcasted by a cell of a roaming PLMN.

3. The communication device of claim 1, wherein the communication device determines that it is roaming, after the communication device is powered on or an airplane mode of the communication device is turned off.

4. The communication device of claim 1, wherein the communication device selects the first roaming PLMN according to the first roaming PLMN ID associated with the first home PLMN ID and a first radio access technology (RAT) to camp on the first roaming PLMN, if the preferred roaming PLMN ID is not stored in the SIM.

5. The communication device of claim 4, wherein the first roaming PLMN ID is further associated with another RAT, and a priority of the first RAT is higher than a priority of the another RAT.

6. The communication device of claim 1, wherein the storage unit further stores an instruction of: associating a second RAT of the second roaming PLMN with the second roaming PLMN ID, if the communication device registers to the second roaming PLMN via a cell of the second RAT.

7. The communication device of claim 1, wherein the storage unit further stores an instruction of: transmitting information of the second roaming PLMN ID and the first home PLMN ID to a server.

8. The communication device of claim 7, wherein the information comprises location information related to the second roaming PLMN ID.

9. The communication device of claim 1, wherein the SIM is an integrated circuit (IC) card, an IC embedded in the communication device, or a partition of the storage unit.

10. The communication device of claim 1, wherein the first home PLMN ID is associated to a combination of a mobile country code (MCC) and a mobile network code (MNC).

11. A network of handling a public land mobile network (PLMN) selection, comprising:
    a storage unit, for storing instructions of:
    the network receiving information of a roaming PLMN ID, a home PLMN ID, and an association between the home PLMN ID and the roaming PLMN ID from a first user equipment (UE); and
    the network transmitting the information of the roaming PLMN ID, the home PLMN ID, and the association between the home PLMN ID and the roaming PLMN ID to a second UE; and
    a processing means, coupled to the storage unit, configured to execute the instructions stored in the storage unit.

12. The communication device of claim 11, wherein the information comprises a radio access technology (RAT) associated with the roaming PLMN ID.

13. The communication device of claim 11, wherein the information comprises location information related to the roaming PLMN ID.

* * * * *